Nov. 13, 1962 T. H. CHEGWIDDEN 3,064,181

MAGNETIC AMPLIFIER

Filed Sept. 4, 1956 3 Sheets-Sheet 1

INVENTOR
T. H. CHEGWIDDEN
BY Sto. Adams, Jr.
ATTORNEY

INVENTOR
T. H. CHEGWIDDEN
BY [signature]
ATTORNEY

Nov. 13, 1962 T. H. CHEGWIDDEN 3,064,181

MAGNETIC AMPLIFIER

Filed Sept. 4, 1956 3 Sheets-Sheet 3

INVENTOR
T. H. CHEGWIDDEN
BY
[signature]
ATTORNEY 3,064,181

MAGNETIC AMPLIFIER

Thomas H. Chegwidden, Hanover Township, Morris County, N.J., assignor to Bell Telephone Laboratories, Incorporated, New York, N.Y., a corporation of New York Filed Sept. 4, 1956, Ser. No. 607,806
5 Claims. (Cl. 323—56)

This invention pertains to magnetic amplifiers, and particularly to power supply arrangements utilizing magnetic amplifiers.

In many multistage magnetic amplifier circuits it is necessary to provide alternating current power for the various stages from a common supply while still maintaining electrical isolation of each stage from the other. Very often it is also necessary that the power supplied to some stages be at different voltages from that supplied to the others. Conventionally, these requirements have been met by using several transformers or transformer windings to convert the supply voltage to the various required values and/or to provide the requisite electrical isolation. This, however, necessitates a great increase in the bulk, weight and cost of the complete circuit.

Accordingly, the object of the instant invention is to provide means whereby a plurality of magnetic amplifiers may be connected to a common power supply while still maintaining electrical isolation of the stages from each other and without using any isolating or power transformers.

A further object is to provide means whereby a conventional magnetic amplifier may be utilized as a power transformer.

In accordance with the invention, the cores of a magnetic amplifier are utilized to serve also to magnetically link auxiliary windings placed thereon to the power windings which energize the amplifier from the alternating power supply. These power windings are connected in series with at least one other power winding which links an additional auxiliary winding by another magnetic path which may itself be part of another magnetic amplifier. Since the cores of a magnetic amplifier are driven to saturation during part of each cycle of the alternating power supply, the voltage induced in any individual winding linking any core has a highly distorted waveshape. Such a voltage could not, of course, serve to supply other circuits in lieu of a sinusoidal alternating voltage supply. However, the invention recognizes that the various magnetic paths linking the auxiliary winding may be, and usually are, so operated that at any given time at least one of these paths is not magnetically saturated. Consequently, by connecting the auxiliary windings so the voltages induced in them by the power windings are series-aiding, the total voltage across all the auxiliary windings must always be a fixed proportion of the supply voltage applied to the power windings. Due to the series-aiding arrangement, harmonics produced in individual auxiliary windings balance each other out, resulting in a voltage wave-shape the same as that of the alternating supply. That is, the auxiliary windings serve as the secondary of a transformer of which the power windings constitute the primary. Any number of such groups of auxiliary windings may be provided, so that any desired number of different voltages may be obtained for supplying power to other magnetic amplifiers or to auxiliary circuits. Indeed, any magnetic amplifier so supplied can itself be provided with auxiliary windings which, in turn, are utilized to supply one or more additional amplifiers. This elimination of all power transformers results in significant savings in space, weight and cost of a multistage circuit.

An additional advantageous feature of the invention results from the fact that the impedance seen by a load connected to the auxiliary windings is a reflection of that seen by the power windings looking toward the power line. It is, therefore, sufficiently low so that the auxiliary windings may be used to supply alternating voltage to another magnetic amplifier without use of any intermediate impedance matching transformer. No feedback will exist between the two amplifiers in such a circuit because the total voltage induced in the auxiliary windings is independent of the load current of either amplifier.

Figure 1:
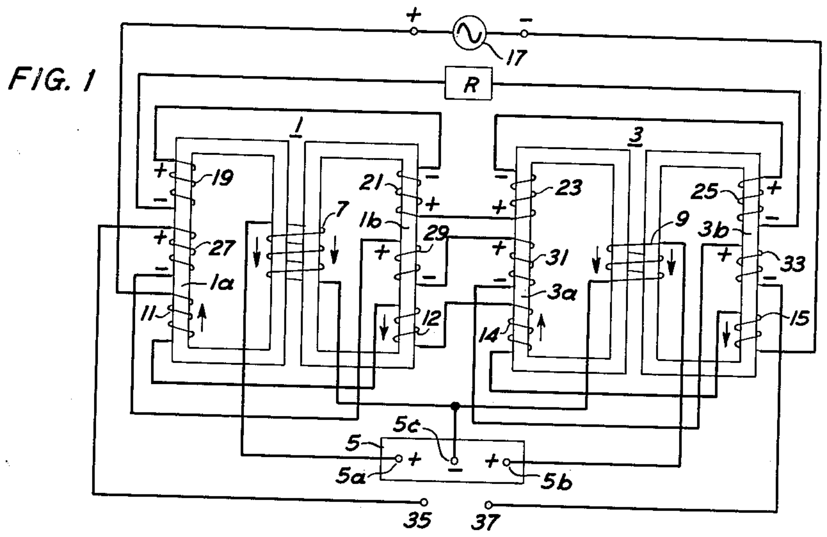
FIG. 1 is a circuit diagram of a typical push-pull magnetic amplifier provided with auxiliary windings in accordance with the invention.

In FIG. 1 is shown the circuit of a push-pull magnetic amplifier employing two saturable reactors 1 and 3 of the type known as saturable transformers. The term "saturable reactor" is often used interchangeably with "magnetic amplifier," but is used herein to designate each one of the two single-sided magnetic amplifiers comprising the complete push-pull circuit. Reactor 1 includes a pair of magnetic cores 1*a* and 1*b*, and reactor 3 includes a pair of magnetic cores 3*a* and 3*b*. A push-pull direct current signal source 5, having two signal terminals 5*a* and 5*b* and a common return terminal 5*c*, is connected across a pair of series-connected control windings 7 and 9 which, preferably, have the same number of turns. Winding 7 links cores 1*a* and 1*b* of reactor 1, and winding 9 links cores 3*a* and 3*b* of reactor 3. The direction of the turns of these windings is the same, whereby when current in control winding 7 produces flux in a downward direction in cores 1*a* and 1*b*, current in winding 9 produces flux in a downward direction in cores 3*a* and 3*b*. Four power windings 11, 12, 14, and 15 are connected in series across a source of sinusoidal alternating power 17, and, preferably, each have the same number of turns. Of these windings, 11 and 12 are respectively wound on cores 1*a* and 1*b* in opposition, whereby current flowing through them from source 17 produces fluxes in opposite directions in those cores with respect to control winding 7. Similarly, power windings 14 and 15 are respectively wound on cores 3*a* and 3*b* in opposition with respect to control winding 9. Also wound on cores 1*a*, 1*b*, 3*a*, and 3*b*, respectively, are four gate windings 19, 21, 23, and 25. Gate windings 19 and 21 as a pair are connected series-aiding, whereby the voltages induced in them by the alternating fluxes circulating in core legs 1*a* and 1*b* are in the same direction in series. Similarly, the gate windings 23 and 25 as a pair are connected in series-aiding. However, these two winding pairs are interconnected in series opposition, whereby the total voltage across the pair of gate windings 19 and 21 is opposed to the total voltage produced across the pair of gate windings 23 and 25. An output load R is connected across all four gate windings.

When source 5 is producing a balanced signal output, the direct currents in windings 7 and 9 are equal and at a preselected quiescent value, and equal direct current fluxes are produced in the cores of reactors 1 and 3. The alternating currents in power windings 11 and 12 produce alternating fluxes which circulate around cores 1*a* and 1*b* without affecting control winding 7 because the fluxes in cores 1*a* and 1*b* which link that winding are in opposition. Similarly, the alternating currents in power windings 14 and 15 produce alternating fluxes which circulate around cores 3*a* and 3*b* without affecting control winding 9. In FIG. 1 the operating conditions at one instant are depicted by the polarity markings and flux direction arrows. Terminals 5*a* and 5*b* are shown positive relative to terminal 5*c*, so that the direct currents in control windings 7 and 9 produce fluxes in the cores of reactors 1 and 3, respectively, in the directions shown by the arrows adjacent those windings. When the polarity of source 17 is instantaneously as shown by the polarity markings at its terminals, the directions of the fluxes which power windings 11 and 12 produce in cores 1*a* and 1*b* and which power windings 14 and 15 produce in cores 3*a* and 3*b* will be as shown by the arrows adjacent those windings. These alternating fluxes induce voltages in gate windings 19, 21, 23, and 25 having the polarities shown by the polarity markings adjacent those windings. When the polarity of source 17 reverses, all polarities and flux directions also reverse except the direct fluxes produced by control windings 7 and 9.

For either polarity of sources 5 and 17, for each of reactors 1 and 3 the direct flux aids the alternating flux in one core and opposes that in the other core. On alternate half cycles of source 17 the cores in which the fluxes are aiding and opposing are interchanged. Considering reactor 1, each of cores 1*a* and 1*b* is alternately driven to saturation and out of saturation during each cycle of the voltage of source 17. When that voltage starts the half cycle in which its polarity is as shown in FIG. 1, the direct flux in core 1*a* aids the alternating flux in that core and the direct flux in core 1*b* opposes the alternating flux in that core. On the next half cycle of the voltage of source 17 the fluxes will be aiding in core 1*b* and opposing in core 1*a*. The quiescent direct current signal produced by source 5 when balanced, the number of turns of the control and power windings, and the amplitude of the voltage of source 17 may be so selected that, with the quiescent value of direct current in control winding 7, each of cores 1*a* and 1*b* is cyclically driven through a minor dynamic hysteresis loop which does not extend past the "knee of the core." In that situation the changing flux in both cores results in a voltage across gate windings 19 and 21 which is sinusoidal and of a magnitude which is a fraction of that of source 17 equal to the turns ratio of the gate windings to power windings 11 and 12; that is, the pair of gate windings and the pair of power windings are transformer coupled. It is for this reason that the circuit of FIG. 1 is generally referred to as a magnetic amplifier of the push-pull saturable transformer-type. The saturable reactor as such is described in Patent 2,230,558 to A. E. Bowen, issued February 4, 1941, and assigned to applicant's assignee.

If the signal current produced by source 5 should be unbalanced so that the direct current in control winding 7 exceeds the quiescent value which exists at balance, the flux excursions along the minor dynamic hysteresis loops of each of cores 1*a* and 1*b* will extend past the knee of the core hysteresis curve and so will be reduced in each cycle. This results in a reduction in the voltage produced across power windings 11 and 12 and across load windings 19 and 21. In addition, the portions of these flux excursions which extend past the knees of the hysteresis curve result in production of appreciable voltages at harmonics of the frequency of source 17. On the other hand, if the unbalance of source 5 is such as to decrease the direct current in control winding 7 below the quiescent value which exists at balance, the only effect will be that cores 1*a* and 1*b* are driven through larger minor loops in each cycle of the voltage of source 17. No harmonic voltages are then produced, a transformer-type coupling always existing between the pair of gate windings and the pair of power windings.

While the foregoing description was given in terms of reactor 1, it also applies to reactor 3. As a result, when the control currents in windings 7 and 9 are equal the voltage across the pair of gate windings 19 and 21 of reactor 1 will be equal and opposite to that across the pair of gate windings 23 and 25 of reactor 3. The net voltage across the load R is then zero, as it should be since the circuit is a push-pull amplifier. However, when source 5 is producing an unbalanced signal output, such that, for example, the current at terminal 5*a* exceeds that at terminal 5*b*, the direct current in winding 7 is increased over the quiescent value existing at balance and the current in winding 9 is reduced below that value. The voltage produced across the pair of gate windings 19 and 21 of reactor 1 will then be less than that across the pair of gate windings 23 and 25 of reactor 2, and a net voltage is produced across load R in the same direction as that across load windings 23 and 25. If source 5 should produce an unbalanced signal output in the reverse direction, such that the current at terminal 5*b* exceeds that at terminal 5*a*, the situation will be reversed and the voltage across load R will be in the same direction as that across windings 19 and 21.

It is apparent that the foregoing circuit is duo-directional, meaning that the phase of the output voltage reverses in response to a reversal in the applied push-pull signal. This is a primary objective of the push-pull type magnetic amplifier circuit. In addition, the magnitude of the voltage across load R is dependent on the degree of unbalance of the push-pull signal from source 5. Since it requires only a small change in the unbalance of the signal from source 5 to cause a large change in the flux excursions of the cores along their minor hysteresis loops, and therefore a large change in load voltage, amplification of the applied signal is achieved.

Since the production of a voltage across load R depends on the cores of one of reactors 1 and 3 being subjected to asymmetrical flux excursions, this voltage includes multiple harmonic components as well as a fundamental component at the frequency of source 17. Actually, even when the push-pull signal from source 5 is balanced, the nonlinearity of the core hysteresis loops results in production of even harmonic voltages across load R.

Up to this point the description of FIG. 1 has been concerned with the operation of the conventional features of the amplifier circuit depicted. However, as shown in that figure, two auxiliary windings 27 and 29 are wound on cores 1*a* and 1*b* respectively, and are connected in series so that the voltages induced in them by power windings 11 and 12 are in aiding relationship. In addition, two auxiliary windings 31 and 33 are wound respectively on cores 3*a* and 3*b* and are also connected in series so that the voltages induced in them by power windings 14 and 15 are aiding. Auxiliary windings 29 and 31 are connected in series, the connection being such that the voltages in all four auxiliary windings are aiding. The numbers of turns of all auxiliary windings are established so that the turns ratio of each relative to the power winding on the same core is the same.

Reference is frequently made in this specification and in the appended claims to windings being connected in series "aiding" or series "opposing." In the "aiding" case this should be understood to mean that the windings are so connected in series that the voltages induced in them by the power windings are vectorially additive. The total voltage is then greater than either winding voltage. In the "opposing" case those voltages are vectorially subtractive, the total voltage being less than either winding voltage. Usually, the voltages across the power windings are in phase. Consequently, the voltages induced in the auxiliary windings linking them and connected series-aiding will be arithmetically additive. However, the voltage across one of the power windings may in some cases be at some phase angle other than zero relative to the voltage across another power winding. Auxiliary windings linking those power windings are then considered to be connected series-aiding when the voltages induced in them have the same relative phases, in series, as the power winding voltages. This situation may arise if one of the power windings is shunted by a reactive element which serves other purposes.

During the interval before either of the cores of reactor 1 or those of reactor 3 have been driven to saturation, the voltage across any pair of windings of reactor 1 will be equal to the voltage across the corresponding pair of windings of reactor 3. If the voltage of source 17 is denoted as V, the voltage across the pair of power windings 11 and 12 of reactor 1 and that across the pair of power windings 14 and 15 of reactor 3 will each be $$\frac{V}{2}$$

The voltage across the pair of auxiliary windings 27 and 29 of reactor 1 and that across the pair of auxiliary windings 31 and 33 of reactor will each be $$n\frac{V}{2}$$

where "$n$" is the turns ratio of each auxiliary winding to the power winding on the same core. The net voltage across the auxiliary windings, connected series-aiding, is then $n$V. In addition, the voltage across the pair of gate windings 19 and 21 of reactor 1 and that across the pair of gate windings 23 and 25 of reactor 3 will each be $$m\frac{V}{2}$$

"$m$" being the turns ratio of the gate windings to the power windings. No voltage is then produced across load R because these gate winding voltages are equal and opposite.

If the direct current signal current from source 5 is balanced, the foregoing conditions will exist at all instants in each cycle of the voltage of source 17. However, if the signal currents are unbalanced, the cores of the reactor which are subjected to increased signal current will be alternately driven to saturation earlier in each half cycle of the voltage of source 17. Assume that this is the case for reactor 1. Each time one of cores **1*a* or 1*b* becomes saturated, the voltages across the pairs of gate, power and auxiliary windings of reactor 1 drop virtually to zero. A detailed explanation of this phenomenon is contained in the article "The Magnetic Amplifier" by W. C. Johnson, appearing on pages 583 to 588 of the July 1953 issue of "Electrical Engineering," vol. 72. The voltage across the pair of gate windings 19 and 21 and the voltage across the pair of auxiliary windings 27 and 29 therefore each have a waveshape comprising a series of pulses of alternating polarity, each pulse following the waveshape of the voltage of source 17 until it is sharply reduced to zero by saturation of one of the cores. Neither of the cores of reactor 3, which is subjected to reduced signal current, will be saturated when one of those of reactor 1 saturates. Consequently, when that event occurs, the drop to zero of the voltage across the pairs of power windings 11 and 12 of reactor 1 results in a rise in the voltage across the pair of power windings 14 and 15 of reactor 3 to the value V; that is, those windings then absorb the entire voltage of source 17. The voltage across the pair of gate windings 23 and 25 of the second reactor becomes $m$V and the net voltage across load R becomes the same value. The voltage across load R during each half cycle of source 17 therefore is zero until one core of either reactor saturates, and then sharply rises to follow the waveform of the voltage of source 17 until the end of the half cycle. This voltage pulse will be initiated earlier as the unbalance of signal source 5 increases, and its waveform is equivalent to a fundamental frequency sinusoid plus a large number of harmonic frequency sinusoids. However, in the case of the pair of auxiliary windings 31 and 33 of reactor 3, the voltage across them becomes $n$V when a core of reactor 1 saturates as described. The net voltage across both pairs of auxiliary windings is then also $n$V. This is the same voltage as existed before a core of reactor 1 saturated, so that no harmonic voltages appear across the terminals 35 and 37** of all auxiliary windings in series.

The situation described in the preceding paragraph continues until the next half cycle of source 17, and then repeats in the same manner except that all voltages are reversed. If the reactor subjected to increased signal current is reactor 3 instead of reactor 1, the operation of the circuit will be as described except that it will be reactor 1 which supports the various voltages when a core of reactor 3 saturates in each half cycle. The direction of the voltage across load R will reverse, but the voltage at terminals 35 and 37 of the four auxiliary windings, connected series-aiding, as described, will remain a constant proportion of the voltage of alternating current source 17.

From the foregoing description it is apparent that the auxiliary windings are coupled to source 17 in the same manner as if the power windings of both reactors were the primary of a transformer of which the secondary comprised the auxiliary windings of both reactors. The auxiliary windings may thus serve as a power supply for a load connected across terminals 35 and 37. If a load is so connected, the voltage applied to it and the resulting current will be completely independent of the unbalance of the signal current from source 5 because, as described, no matter what the value of that current may be the alternating voltage produced at terminals 35 and 37 remains constant. In addition, the output impedance of the auxiliary windings will be low because it comprises only the impedance of source 17 reflected to terminals 35 and 37 by the transformer-like behavior described. This permits direct connection of the power windings of another magnetic amplifier across terminals 35 and 37, to receive alternating power, without feedback or cross-talk, and without interposing an impedance matching or isolating transformer.

Figure 2:
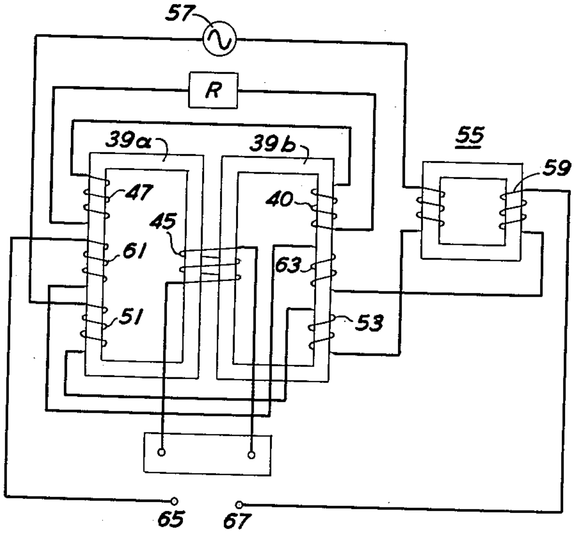
FIG. 2 is a circuit diagram of a saturable reactor supplied with power through the winding of a magnetic core choke, and wherein auxiliary windings, as taught by the invention, couple the cores of the reactor and the choke.

Besides being applicable to a push-pull magnetic amplifier as in FIG. 1, where two saturable reactors are utilized, the invention is also applicable to a circuit comprising only one such reactor, or single-sided magnetic amplifier, so long as such a circuit comprises portions linking at least one unsaturated magnetic path at all times. An arrangement of this kind is shown in FIG. 2. The single-sided magnetic amplifier in FIG. 2 comprises a pair of magnetic cores **39*a* and 39*b* linked by a common control winding 45. Gate windings 47 and 49 respectively link cores 39*a* and 39*b* and are connected in series to an output load R. Power windings 51 and 53 also respectively link cores 39*a* and 39*b* and are connected in series through the winding of a magnetic core choke 55 to an alternating power supply 57. This choke is so designed that it never reaches full saturation under normal operating conditions. Linking the core of choke 55 is an auxiliary winding 59 which is connected in series with a pair of series-connected auxiliary windings 61 and 63 respectively linking cores 39*a* and 39*b*. Power windings 51 and 53 are wound so the alternating fluxes in cores 39*a* and 39*b* are in opposition where they link control winding 45. Auxiliary windings 61 and 63** are wound so the alternating fluxes linking them produce voltages which are aiding in the series connection of these coils.

Due to the fact that choke 55 never fully saturates, at least one auxiliary winding, namely 59, is always magnetically linked to alternating source 57. When neither of cores 39*a* and 39*b* is saturated, auxiliary windings 61 and 63 are linked to source 57 via the transformer-like coupling provided by power windings 51 and 53. When one of the cores does saturate so that this coupling no longer exists, auxiliary winding 59 is still linked to source 57 via the transformer-like coupling to the winding of choke 55. Consequently, the voltage at terminals 65 and 67 of the series-connected auxiliary windings is a proportion of the voltage of source 57 determined by the turns ratio of auxiliary windings 59, 61 and 63 relative to the winding of reactor 55 and power windings 51 and 53, respectively. To maintain constant voltage across terminals 65 and 67 regardless of the direct current signal applied to control winding 45, the turns ratio of the windings linking the core of choke 55 should be the same as the turns ratio of the auxiliary windings to the power windings linking cores 39*a* and 39*b*. This voltage will be free of harmonics, just as in the push-pull circuit described above with reference to FIG. 1. The drop in voltage across auxiliary windings 61 and 63 at the instant of saturation of either core 39*a* or 39*b* of the amplifier is balanced by the corresponding increase in voltage at that time across auxiliary winding 59.

Figure 3:
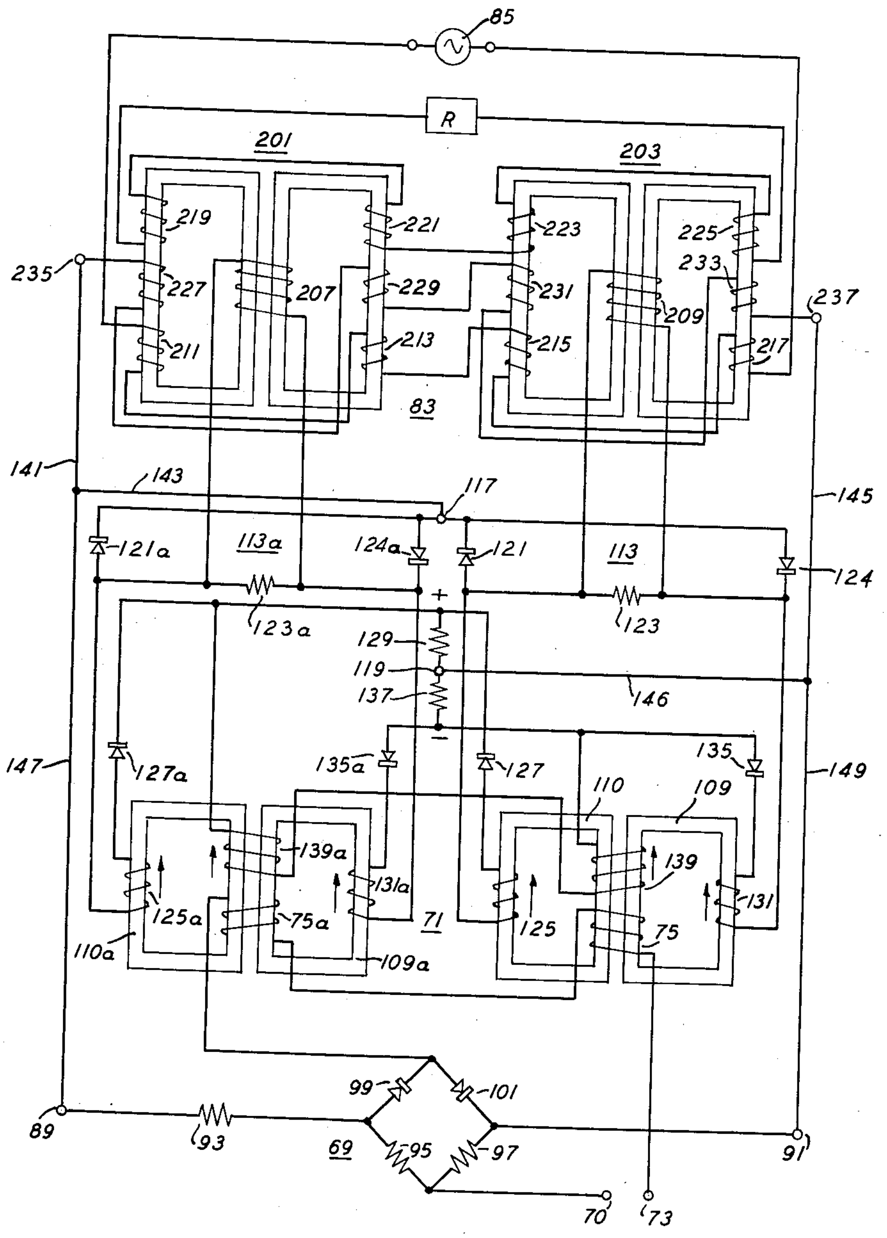
FIG. 3 is a circuit diagram of a two-stage push-pull magnetic amplifier wherein the second stage is provided with auxiliary windings which supply power to the first stage in accordance with the principles of the invention.

The utility of the invention in a multistage magnetic amplifier is illustrated by the two-stage cascade magnetic amplifier of FIG. 3. This circuit comprises a phase sensitive rectifier 69 operative to rectify an input alternating current signal applied to terminals 70 and 73 and to supply the rectified signal to the control windings 75 and 75*a* of a push-pull self-saturating magnetic amplifier 71. This amplifier provides two direct output voltages in push-pull relationship which are respectively applied to the two control windings 207 and 209 of a saturable transformer type push-pull magnetic amplifier 83 the same as that described above with reference to FIG. 1. Amplifier 83 provides an alternating current signal output to load R. Even though amplifiers 71 and 83 are designed to operate with different power supply voltages, a single alternating power supply 85 is utilized in this circuit to provide power at the proper voltage to both amplifiers by virtue of use of auxiliary windings in accordance with the invention linking the cores of each reactor comprised in amplifier 83 and serving as a power source for amplifier 71. Amplifier 71 includes a negative feedback type of biasing circuit which compensates for variation in the voltage and frequency of source 85 and in ambient temperature so as to maintain the sum of the output voltages of the amplifier constant in spite of such variations.

Phase sensitive rectifier 69 is utilized in this circuit because it has been found that self-saturating magnetic amplifiers are much less sensitive to alternating current than direct current signals, and so do not have adequate response to alternating current phase reversals. The rectifier circuit is shown alone in FIG. 4. A source of sinusoidal phase reference voltage 87 is applied across the terminals 89 and 91 and corresponds to a source of such voltage in FIG. 3, connected across terminals 89 and 91, to be described hereinafter. Between these terminals there is connected in series a voltage dropping resistor 93 and a bridge circuit of which one side comprises a pair of equal resistors 95 and 97 in series and the other side comprises a pair of matched diodes 99 and 101 in series. These diodes are poled in the same direction around the bridge loop, and are preferably of the semiconductor type. When they conduct there is a constant internal voltage drop $v$ across each of them. These are also threshold values, since neither diode will be substantially conductive until the voltage applied across it exceeds its internal voltage drop $v$. An alternating current input signal is applied to terminals 70 and 73 and is of the same frequency as reference source 87. Terminal 70 is connected to the junction of resistors 95 and 97 and terminal 73 is connected through an output load 107 to the junction of diodes 99 and 101. Load

107 would correspond to the series-connected control windings 75 and 75*a* of amplifier 71 in FIG. 3.

Current can flow from source 87 through diodes 99 and 101 only during the half cycles when terminal 89 is positive relative to terminal 91, since only then will voltage be in the forward direction across the diodes. If the signal voltage is then zero, the bridge circuit will be balanced and no current will flow through load 107. Current will, however, flow through both arms of the bridge in parallel. Typical values of resistors 95 and 97 are 2600 ohms each, while for silicon diodes the internal voltages $v$ will each be only about 2 volts. Resistor 93 may typically be 12,000 ohms. With these values all but 4 volts of the voltage of source 87 will be absorbed by resistor 93. In addition, that resistor also limits the current through diodes 99 and 101 to only a few milliamperes. However, during negative half cycles of source 87, when neither diode is conductive, current flows through resistors 97, 95 and 93 in series. Over one-third of the voltage of source 87 then exists across resistors 95 and 97.

Now suppose that a signal voltage is applied across terminals 70 and 73 which is in phase with source 87. By this is meant that the polarity of terminal 70 relative to terminal 73 is always the same as the polarity of terminal 89 relative to terminal 91. Then during each half cycle of source 87 during which terminal 89 is positive relative to terminal 91, which will be denoted the positive half cycles, signal current will flow from terminal 70 in a path through resistor 95, diode 99 in the forward direction, load 107 in a downward direction, and to terminal 73. Due to the finite reverse impedance of diode 101, a small signal current will also flow in a parallel path through resistor 97, diode 101 in the reverse direction, and downward in load 107. During negative half cycles of source 87 the signal voltage is also reversed, terminal 70 being negative. Consequently, current from the signal source tends to flow through load 107 in the upward direction. If this occurred, the desired rectification of the signal would not be achieved. It is prevented by establishing the voltage of source 87 at a high enough value so that it produces a voltage across resistor 97 during negative half cycles which is greater than the signal voltage plus the internal voltage $v$ of diode 101. The net voltages across both diodes are then in the reverse direction, and neither diode conducts. The voltage produced across resistor 97 by source 87 during negative half cycles therefore sets a limit on the maximum allowable signal voltage.

Now suppose that the signal voltage is 180 degrees out of phase with source 87. In this case the polarity of terminal 70 relative to terminal 73 is always opposite to that of terminal 89 relative to terminal 91. During each positive half cycle of source 87 both diodes will conduct as previously, but signal current flows from terminal 73, through load 107 in an upward direction, diode 101, and resistor 97 to terminal 70. A small signal current will also flow in a parallel path through diode 99 and resistor 95 due to the finite reverse impedance of diode 99. Current from the signal source then tends to flow through load 107 in the reverse direction, downwardly. This is prevented, similarly to the case described above, by establishing the voltage of source 87 at a high enough level so it produces a voltage across resistor 95 during negative half cycles which is greater than the signal voltage plus the internal voltage $v$ of diode 99. The net voltage produced across resistor 95 during negative half cycles therefore also sets a limit on the maximum allowable signal voltage.

The direct current through load 107 is a maximum when the signal voltage is either in phase with source 87 or 180 degrees out of phase. For intermediate phase relations the direct current will be smaller, and is accompanied by an increased alternating component. For a 90 degree phase difference the current through load 107 would have no direct component, which would defeat the purpose of the rectifier. It is therefore necessary to either adjust the phase of reference source 87 until the direct current through load 107 is a maximum for a given signal voltage, or to derive the alternating phase reference voltage 87 from the same generator as the signal voltage. The phase of a given voltage source can, of course, be easily adjusted by connecting one of the many known types of phase shifters between the source and terminals 89 and 91 of the rectifier in FIG. 3. Some of these are described on pages 277 and 278 of the text "Electronic Measurements" by F. E. Terman and J. M. Pettit, published by the McGraw-Hill Company, Inc., second edition, 1952. Once this adjustment is made, and assuming that the phase of the signal voltage may reverse but will not otherwise vary, the magnitude of the rectified current through load 107 will depend only on the amplitude of the signal voltage. This is the type of signal most often encountered in servo systems.

Figure 4:
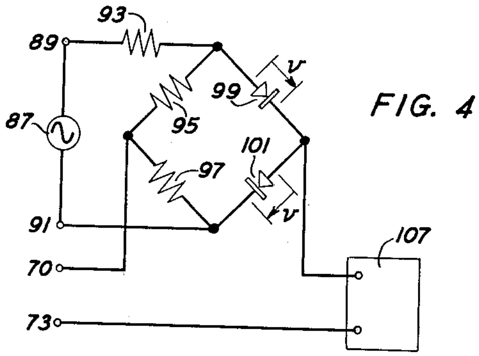
FIG. 4 is a circuit diagram of a phase-sensitive detector utilized in the circuit of FIG. 3.

It is to be noted that the presence of resistor 93 greatly extends the range of signal voltage amplitudes over which the rectifier circuit of FIG. 4 performs satisfactorily. During positive half cycles of source 87, when current flow through load 107, resistor 93 functions to limit the current flow through diodes 99 and 101. If these are semiconductor diodes they generate error voltages in the signal transmission paths due to unbalance or noise, which increase as the current from source 87 increases. In addition, the nonlinear variations in the resistance and voltage drop of this type of diode at large reference currents tends to distort the effect of small changes in signal voltage on load current. By limiting the reference current the circuit is made more sensitive to small signal voltages.

The upper limit of the signal voltage range is also extended by the presence of resistor 93 because it causes the voltage across each of resistors 95 and 97 to be much greater during negative half cycles of source 87 than during positive half cycles. In accordance with the above explanation of how the negative half cycle voltages across resistors 95 and 97 limit the allowable signal amplitude, the allowable signal amplitude is thereby much greater than if resistor 93 was omitted. The advantages achieved by use of resistor 93 as described are, in addition, achieved without affecting the impedance seen by a signal source connected across terminals 70 and 73 since current from such a source does not flow in that resistor. In summary, therefore, the rectifier of FIG. 4 provides a direct current output of a magnitude which is proportional to that of the signal voltage applied to it, and of a polarity which reverses when the phase of the signal voltage reverses.

With reference again to FIG. 3, control winding 75 links the cores 109 and 110 of reactor 113 and control winding **75*a* cores 109*a* and 110*a* of a reactor 113*a*. The relative winding directions are opposite, so that one winding produces flux in an upward direction when the other produces flux in a downward direction. Reactors 113 and 113*a* are each of the self-saturating type, together comprising a push-pull amplifier 71. Terminals 117 and 119 constitute the alternating power input terminals for amplifier 71**.

Reactor 113 is a bridge-type self-saturating magnetic amplifier. One side of the bridge consists of a diode 124 in series with a gate winding 131, an oppositely poled diode 135, and a resistor 137. The other side comprises a diode 121 in series with a gate winding 125, an oppositely poled diode 127, and a resistor 129. Diodes 121 and 124 are connected to input terminal 117, oppositely poled relatively to that terminal, and resistors 129 and 137 are connected to input terminal 119. A load resistor 123 is connected across the bridge, between the junction of diode 124 and winding 131 and the junction of diode 121 and winding 125. Gate windings 125 and 131 are respectively wound on cores 110 and 109, the winding directions being such that current flowing as permitted by the associated diodes 127 and 135 produces fluxes in those cores in opposite rotational directions. A bias winding 139 links cores 109 and 110, and produces flux in each core in opposition to the flux produces by the load winding.

The construction of reactor **113*a* is the same as that of reactor 113, and corresponding elements of its circuit have been identified with the same reference numerals as in reactor 113** but with an identifying suffix *a*. The only difference between the circuits of reactors 113 and **113*a* is that, as stated, control windings 75 and 75*a* are so wound as to produce alternating fluxes in opposite directions in the corresponding cores. In the operation of the arrangement described thus far, when terminal 117 is positive relative to terminal 119 current will flow in reactor 113 from terminal 117 in a path through diode 124, load resistor 123, winding 125, diode 127 and resistor 129 to terminal 119. In reactor 113*a* current flow from terminal 117 through diode 124*a*, resistor 123*a*, winding 125*a*, diode 127*a*, and resistor 129 to terminal 119. When terminal 119 is positive relative to terminal 117, current will flow in reactor 113 in a path from that terminal through resistor 137, diode 135, winding 131, load resistor 123, and diode 121 to terminal 117. In reactor 113*a*, current will then flow from terminal 119 through resistor 137*a*, diode 135*a*, winding 131*a*, resistor 123*a*, and diode 121*a* to terminal 117. It is therefore evident that the current flow through each of load resistors 123 and 123*a*** is always in the same direction, from right to left, and so contains a direct component.

In the absence of a signal applied to terminals 70 and 73 of rectifier 69 there will be no current in control windings 75 and **75*a*. However, there will be current flowing in bias windings 139 and 139*a* supplied by means described subsequently. This current is adjusted to return or "reset" the flux in the cores during alternate half cycles to approximately zero, in order to place the reactors in the middle of their possible operating range, and results in saturation of each core about half-way through the following half cycle. Since reactors 113 and 113*a* are the same, the voltages across resistors 123 and 123*a* will be equal. If now an alternating current signal is applied to terminals 70 and 73 such that the resultant direct current in control winding 75 produces a direct flux in each of cores 109 and 110 aiding that produced by bias winding 139, these cores will then alternately be reset through zero flux to a "negative" flux level, that is, the flux will be reversed in direction. A greater portion of each half cycle of the applied alternating supply voltage will then be received to fully saturate a core of that reactor, and the current in its load resistor will be reduced. An increase in signal in the same direction will increase the time required to fully saturate those cores in alternate half cycles, and so further reduces the load current. Since control windings 75 and 75*a* are wound to produce fluxes in opposite directions, by a similar line of reasoning the current in the load resistor of the other reactor is increased when that of the first reactor is decreased by the applied signal voltage at terminals 70 and 73. It is evident that if now the phase of the applied signal should reverse with respect to the alternating supply voltage, the situation would be the same except that the load resistors in which increased and reduced currents are produced would be interchanged. Therefore, the direct voltages across resistors 123 and 123*a*** are in push-pull relationship.

It will be noted from the foregoing description that during one-half cycle of the alternating supply voltage applied across terminals 117 and 119 the paths of the currents in resistor 123 and in resistor **123*a* each include resistor 129 and are in the same direction in that resistor. During the other half cycle of the alternating supply voltage the paths of the currents in resistors 123 and 123*a* include resistor 137** and are in the same direction therein. In addition, the currents in resistors 129 and 137 are both in the same direction. Consequently, the total voltage across the series combination of resistors 129 and 137 is a full wave rectified voltage, the upper terminal of resistor 129 being positive relative to the lower terminal of resistor 137, and of a magnitude proportional to the sum of the output currents of reactors 113 and 113*a*. Since the output currents are wanted in push-pull relationship, when one increases a certain amount the other should decrease by the same amount. This will be so if their sum remains constant, in which case the voltage across the series combination of resistors 129 and 137 will remain constant. However, an increase in the alternating supply voltage will tend to cause an increase in both output currents. Changes in the frequency of the supply voltage and in ambient temperature will affect the hysteresis loops of the cores of amplifier 71, and so will also change the output currents of both of reactors 113 and 113*a* in the same sense. All these effects, therefore, tend to alter the initially balanced operation of reactors 113 and 113*a*, and may result in failure to maintain accurate push-pull operation.

Initial balancing of these reactors, whereby their output currents are equal in the absence of an applied signal at terminals 70 and 73, is achieved by properly biasing the cores of each reactor with a direct current flux. To maintain balance, it is necessary that the biasing fluxes be adjusted to compensate for variations in the sum of the output currents of the reactors. This may be accomplished by providing the requisite current for establishing these fluxes from a negative feedback loop. The biasing arrangement in FIG. 3 accomplishes this objective, and will now be described.

The bias windings 139 and 139*a* described previously are connected in series across resistors 129 and 137 so that current always flows through them in a path from the upper terminal of resistor 129, through winding 139*a*, and through winding 139 to the lower terminal of resistor 137. They thereby produce a flux in each core in a direction opposing the flux produced therein by the load windings, as stated above. Consequently, any environmental effect which tends to increase the currents in resistors 123 and 123*a* will also increase the voltage across resistors 129 and 137, and so tend to increase the current in windings 139 and 139*a*. This subjects all cores to a flux tending to increase the degree to which they are de-saturated and tends to reduce the currents in loads 123 and 123*a*, as described above, thereby preventing the initial tendency for the sum of these currents to increase.

The push-pull related direct voltages across resistors 123 and 123*a* are respectively applied to the control windings 209 and 207 of the output magnetic amplifier 83. This amplifier is identical with that described above with reference to FIG. 1, and includes four auxiliary windings 227, 229, 231 and 233 connected series-aiding and wound on the cores of reactors 201 and 203 in the same manner as the auxiliary windings having the same last two reference numeral digits are wound on the cores of reactors 1 and 3 of the amplifier in FIG. 1. The terminals 235 and 237 of this auxiliary winding correspond to terminals 35 and 37 in FIG. 1. The power windings linking reactors 201 and 203 comprise the pair of series-connected windings 211 and 213 respectively wound on the two cores of reactor 201, and the pair of series-connected windings 215 and 217 respectively wound on the two cores of reactor 203. These pairs of power windings are connected in series across a source of sinusoidal alternating voltage 85.

As explained above with reference to FIG. 1, an alternating voltage will be produced across terminals 235 and 237 having the same waveshape as that of source 85 and a magnitude which is a proportion of the voltage of source 85 depending on the ratio of the number of turns of the auxiliary windings to the number of turns of the power windings of amplifier 83. If the voltage of source 85 is denoted as E, and if each auxiliary winding has $n$ times as many turns as that of the power winding on the same core, the voltage across terminals 235 and 237 will be $n$E. The value of the turns ratio $n$ may be less than or greater than unity, so that it is apparent that any desired voltage transformation may be obtained. The turns ratio is therefore chosen to provide the correct power supply voltage for amplifier 71. Terminal 235 is connected to terminal 117 via leads 141 and 143 and terminal 237 is connected to terminal 119 via leads 145 and 146.

Since the function of the reference voltage applied to rectifier 69 is simply to establish a fixed phase reference, the voltage across terminals 235 and 237 may also serve as the reference voltage for rectifier 69. Accordingly, terminal 235 is connected to rectifier terminal 89 via leads 141 and 147, and terminal 237 is connected to rectifier terminal 91 via leads 145 and 149. Of course, if it should be desired to establish a reference voltage for rectifier 69 of a magnitude different from the supply voltage for amplifier 71, additional auxiliary windings could be provided which link reactors 201 and 203 in a manner identical in all respects with the described auxiliary windings with the exception of the number of turns. This would differ as needed to achieve the desired reference voltage amplitude. In addition, as already mentioned, a phase shifter may be connected between rectifier 69 and terminals 89 and 91 to permit adjusting the phase of the reference voltage applied to those terminals.

The invention is applicable to many other types of cascaded magnetic amplifiers besides the two-stage arrangement of FIG. 1. For example, four stages may be employed by applying the phase reversible alternating output voltage produced across load R of FIG. 3 to a phase sensitive rectifier identical with rectifier 69, and applying the rectified output to a two-stage amplifier circuit identical with that of FIG. 3. In such case, auxiliary windings as described could be provided on either or both of the saturable transformer-type amplifiers to provide power to either or both of the other two amplifiers.

A further possible application of the invention is to a circuit comprising a plurality of amplifiers of the type described in FIG. 1, wherein the auxiliary windings of one or more amplifiers are connected to the power windings of one or more of the remaining amplifiers in lieu of using transformers to connect the latter to the alternating supply. The auxiliary windings of an amplifier so supplied may then be utilized to energize the power windings of still other amplifiers in the circuit.

Figure 5:
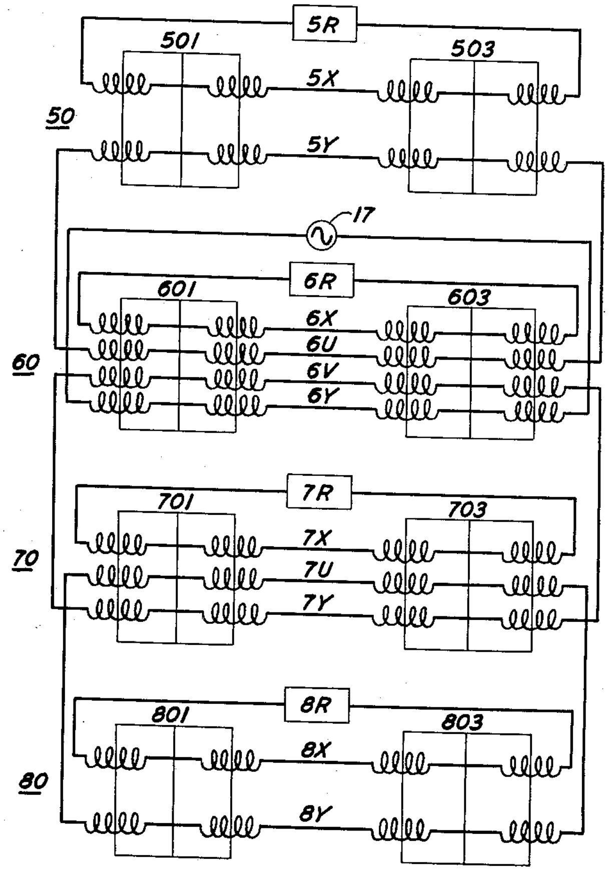
FIG. 5 is a circuit diagram showing how a plurality of amplifiers of the type shown in FIG. 1 may be interconnected in accordance with the invention so that each receives power from a common supply at the correct voltage and without use of any power transformers.

A circuit illustrating arrangements of the type is shown in FIG. 5. This includes four magnetic amplifiers 50, 60, 70, and 80 each identical with that in FIG. 1. These amplifiers have respective output loads 5R, 6R, 7R, and 8R, and each comprises twin saturable reactors having four magnetic cores, as in the amplifier of FIG. 1. The four series-connected gate windings of amplifier 50 are identified as 5X, those of amplifier 60 as 6X, etc. The four series-connected power windings of the respective amplifiers 50 through 80 are identified, respectively, as 5Y through 8Y. Alternating power source 17 is connected across power windings 6Y of amplifier 60. This amplifier has two separate sets of four series-connected auxiliary windings in each set, the sets being identified as 6U and 6V, while amplifier 70 has one set of auxiliary windings 7U. Each set of auxiliary windings is connected as described in FIG. 1. The control windings and signal sources for the amplifiers are not shown since these also are the same as in FIG. 1, each amplifier having its own signal source.

To provide alternating power for amplifier 50, the set of auxiliary windings 6U of amplifier 60 is connected to the power windings 5Y of amplifier 50. The ratio of the total number of turns of auxiliary windings 6U to the total number of turns of power windings 6Y can be chosen so that the voltage across windings 6U is at the value required by windings 5Y. To provide power for amplifier 70, auxiliary windings 6V are connected across power windings 7Y of amplifier 70. The voltage applied to the latter winding is determined by the turns ratio between windings 6V and 6Y, and so can be set as desired. To energize amplifier 80, auxiliary windings 7U are connected across power windings 8Y. The voltage thereby applied to the latter windings is determined by the turns ratio between windings 7U and 7Y multiplied by the turns ratio between windings 6V and 6Y. Hence the auxiliary windings of amplifier 70 here serve as a transformer between amplifiers 60 and 80.

While each saturable reactor, or single stage magnetic amplifier, referred to in this application has been described as having two separate cores and a single control winding linking both cores, it is well known that substantially equivalent results may be achieved by the use of separate control windings respectively linking each core and connected in series. A further known equivalent is to use a single-three-legged core for each reactor. In all such cases the invention will operate in the same manner as described herein.

What is claimed is:

1. In combination with a push-pull saturable transformer-type magnetic amplifier comprising a pair of saturable magnetic cores, a pair of power windings respectively wound on said cores, a control winding wound on both of said cores, gate windings also wound on said cores and connected to form a signal output circuit, a pair of auxiliary windings also respectively wound on said cores in inductive relationship with and electrically isolated from the power windings on the same cores, an additional magnetic core, an additional power winding wound on said additional core, an additional auxiliary winding also wound on said additional core in inductive relationship with and electrically isolated from the power winding thereon, means for applying an alternating power supply voltage across all said power windings in series, means for applying a signal control voltage to said control winding to cause at least one of said saturable cores to become substantially saturated during a part of each cycle of said supply voltage, a pair of power output terminals adapted to be connected to a load, and means for connecting all said auxiliary windings in series-aiding between said power output terminals, whereby a load connected across said power output terminals will be supplied with a voltage which is a proportion of said alternating supply voltage equal to the turns ratio of said series connected auxiliary windings to said series connected power windings.

2. The combination comprising a transformer type magnetic amplifier having at least three magnetic cores, said amplifier having control windings on at least two of its cores for receiving a control or input signal and gate windings on at least the same two cores for delivering an output signal, said amplifier being so constructed that at any given time at least one of its cores is unsaturated, a power winding on each of said cores, means for supplying alternating power to said power windings, an auxiliary winding also on each of said cores wound in inductive relation with and electrically isolated from the power winding, means so connecting said auxiliary windings in series that the voltages induced therein by said power windings are all additive and of substantially the same waveform as the voltage applied to said power windings, and means for connecting said series connected auxiliary windings to an external circuit to supply power thereto.

3. In combination with a transformer-type push-pull magnetic amplifier comprising a pair of saturable reactors having control and gate windings wound thereon, each of said reactors also having a pair of power windings respectively wound on a pair of saturable magnetic cores, means for applying an alternating power supply voltage across said power windings in series, an auxiliary winding for each of said cores wound thereon in inductive relationship with and electrically isolated from the power winding on the same core, a pair of power output terminals adapted to be connected to a load, and means for connecting said auxiliary windings in series between said power output terminals so that the voltages induced therein by said power windings are all additive, whereby the voltage supplied to a load connected between said power output terminals will have substantially the same waveform as said supply voltage.

4. The combination of a transformer-type magnetic amplifier comprising a pair of saturable reactors, each of said reactors comprising a pair of saturable magnetic cores, a pair of power windings for each of said reactors respectively wound on the cores thereof, means for applying an alternating power supply voltage across all said power windings in series, a control winding for each reactor wound on both cores thereof for receiving a control or input signal, gate windings also wound on said cores and connected to form a signal output circuit, a pair of auxiliary windings for each of said reactors respectively wound on the cores thereof in inductive relationship with and electrically isolated from the power windings on the same cores, a pair of power output terminals adapted to be connected to a load, and means for so connecting all said auxiliary windings in series between said power output terminals so that the voltages induced therein by said power windings are all additive, whereby the voltage applied to a load connected between said power output terminals will be a constant proportion of said supply voltage determined by the turns ratio between said series connected auxiliary windings and said series connected power windings.

5. The combination comprising a transformer-type magnetic amplifier having at least three magnetic cores with power, gate and control windings thereon, said amplifier being so constructed that at least one of its cores containing a power winding is unsaturated at any given instant, an auxiliary winding on each core having a power winding, said auxiliary winding being in inductive relationship with and electrically isolated from said power winding, and means connecting said auxiliary windings in series aiding for supplying power at substantially constant alternating voltage to an external circuit.

References Cited in the file of this patent

UNITED STATES PATENTS

| | | |
|---|---|---|
| 1,661,740 | Stoekle | Mar. 6, 1928 |
| 1,884,845 | Peterson | Oct. 25, 1932 |
| 2,108,642 | Boardman | Feb. 15, 1938 |
| 2,164,383 | Burton | July 4, 1939 |
| 2,230,558 | Bowen | Feb. 4, 1941 |
| 2,281,593 | Odessey | May 5, 1942 |
| 2,730,574 | Belsey | Jan. 10, 1956 |
| 2,758,162 | Tekosky | Aug. 7, 1956 |
| 2,770,769 | Seegmiller | Nov. 13, 1956 |
| 2,795,652 | Malick et al. | June 11, 1957 |
| 2,827,608 | Fingerett et al. | Mar. 18, 1958 |
| 2,843,813 | Stammerjohn | July 15, 1958 |

FOREIGN PATENTS

| | | |
|---|---|---|
| 742,494 | Great Britain | Dec. 30, 1955 |

OTHER REFERENCES

"Magnetic Amplifier Circuits," by William A. Geyger, McGraw Hill Book Company, Inc., 1st edition 1954, pp. 71–74.